United States Patent Office 3,221,475
Patented Dec. 7, 1965

3,221,475
WET ELECTROSTATIC PRECIPITATOR
Jean Wiemer, Oberhochstadt, Germany, assignor to Metallgesellschaft Aktiengesellschaft, Frankfurt am Main, Germany
Filed Apr. 10, 1963, Ser. No. 271,970
Claims priority, application Germany, Apr. 12, 1962, M 52,485
9 Claims. (Cl. 55—10)

This invention relates to a wet electric filter or electrostatic precipitator and, in particular, is directed to a method and apparatus for the increased separation of fine dust in such a filter.

When waste gases contain dust which cannot be satisfactorily separated when dry in an electric filter, such dust being that of metallic, phosphate and silicon oxides, then the gas is cleaned in a wet electric filter. Before the gas enters the electric precipitation zones, the gases are treated with a liquid, such as water, in a saturator, cooler, or washer. The larger particles of dust in the waste gas are thus washed and removed from the gas stream. However, fine dust particles remain in the gas and are partially moistened by the liquid. The cooled, saturated and partially precleaned gas then flows through the wet electric filter and the particles of dust which have been enlarged by adsorption of liquid are then separated.

Such a process encounters considerable difficulty if the raw waste gas carries a considerable amount of fine dust. Experience shows that it is not always possible to moisten a large amount of the very fine particles of dust and further that the very fine dust, whether in a dry or wet condition, tends to form space charges which so impairs the electrical conditions in the filter that much of the dust is not separated from the gas.

The object of this invention is to moisten the very fine and finest particles of the dust carried by the raw waste gas as much as possible and then to eliminate the disturbing space charges in the electric precipitation zones in order to separate the dust from the gas.

In general, these objects are obtained with the use of a wet electric filter in which the entering flow of raw gas is divided into two or more separate streams of gas and each separate stream of gas is treated in a saturator, such as a hurdle-type scrubber, a venturi washer, or a washer combination with a cooling and/or washing liquid before entering the electric filter zones. According to this invention, these separate streams of gas are further treated before entering the electric filter zone by saturating and cooling the streams to different temperatures from each other and then mixing the streams in such a manner that a mist is formed, which mist is passed into the electric filter zones. The electric filter is divided into a plurality of filter units which have different degrees of effect upon the mist for the separation of the condensate containing dust. In this manner, the amount of dust removed from the gas is considerably increased.

A further feature of this invention lies in subdividing the electric filter into three electric filter units. The first unit encountered by the mist has barbed wire emitting electrodes, the second unit has wire emitting electrodes star shaped in cross-section, and the third and final unit has round wire emitting electrodes, each wire having a cross-sectional area of, preferably, about from 20 to 50 mm.$^2$.

As set forth in German Patent No. 458,876, emitting electrodes in the form of round wires of varying thicknesses have been used for eliminating space charges in electric filters. In practice, it has been found that the round wires must have a certain diameter in order to achieve a relatively high spark effect and that this diameter should be from 0.7 to 1.2 mm. However, such wires are unsuitable for use in a rough raw gas electric filter because they would soon be damaged and destroyed by reason of the vibrations caused by the electrical wind or possibly by electrical arcing. Consequently, a feature of this invention is the use of different kinds of emitting electrode wires with regard to their form rather than the use of wires of varying thickness, and the diameter or cross-sectional area of the wires used is from between 20 and 50 mm.$^2$.

Because of the formation of a mist according to this invention, after the separate streams of gas have been given different temperatures and then mixed, almost all of the fine as well as the finest particles of dust which form the cores of particles of condensation are moistened.

Experiments with this invention have shown that the first unit in the wet electric filter eliminates the space charges by reason of the barbed emitting electrodes. The very fine water droplets in the mist are saturated in this first filter unit and in the following second unit so that most of the wetted dust becomes precipitated from the gas. The remaining water droplets then pass into the third filter unit in which there is such a field of condensation that substantially all of the remaining dust is precipitated.

The intimate mixing of the saturated separate gas streams must be done with great care. Ordinarily special mixing chambers provided with deflection devices or propellers are used for this purpose. According to this invention, in addition this intimate mixing of the saturated and cooled separate streams of gas having different temperatures is achieved simply by causing the gases to flow against the inner wall of a chamber having semispherical shape and which wall is also a part of the narrowed end of the filter.

The means by which the objects of the invention are obtained are described more fully with reference to the accompanying drawings in which.

Figure 1:
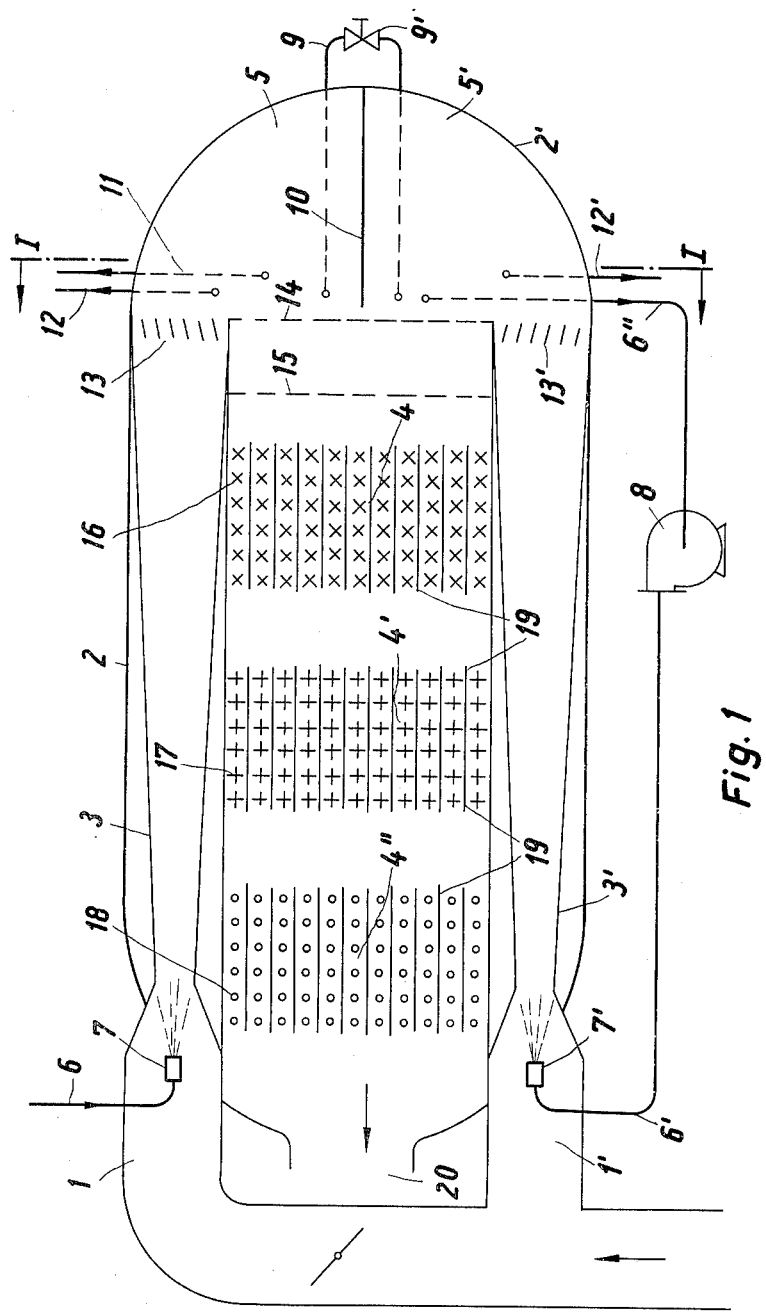
FIGURE 1 is a horizontal cross-sectional view through the filter apparatus and as seen on the line II—II of FIGURE 2.

As shown in FIGURE 1, the raw gas is separated by two conduits 1 and 1' into separate streams of gas as it enters filter housing 2. The separate streams of gas pass through venturi tubes 3 and 3' respectively. The separate streams of gas leaving the venturi tubes pass through the three filter units 4, 4' and 4" after having been mixed over the sump 5 and 5'. As the separate gas streams enter their respective venturi tubes, they are sprayed with cooling and cleansing liquid, such as water, at different temperature and volumes. Venturi tube 3 is constantly supplied with fresh water through pipe 6 and nozzle 7. Venturi tube 3' is supplied with recycled water through pipe 6' and nozzle 7'. This water circulates through venturi tube 3', sump 5', pipe 6", pump 8, pipe 6' and nozzle 7'. In this circulating system, the water lost by being carried with the gases into the electric filter is made up by water from sump 5 which flows to sump 5' by means of a pipe 9 containing valve 9'. Partition 10 separates sumps 5 and 5' so that the fresh water sump 5 has a lower temperature than that of sump 5'. The quantity of make-up water added to sump 5′ also prevents salt deposits in the circulation system of venturi tube 3′.

Fresh water injected through nozzle 7 into venturi tube 3 preferably has a temperature of from about 4 to 30° C. It is removed from sump 5 by drain pipe 11. Drain pipes 12 and 12′ are provided to take care of an emergency overflow. Since a certain amount of water is required in venturi tube 3′ for the constant recycling, it should be of a higher temperature than that in venturi tube 3 so that it does not cool too much while being recycled. Therefore, the temperature of the water for venturi tube 3′ is preferably from about 20 to 60° C. However, if the temperature should rise too high in the recycled water as would occur by reason of an increase in the temperature of the gas, then the water temperature can be lowered by opening valve 9′ which will permit flow of cool water from sump 5 into sump 5′. The amount of cooling water entering sump 5′ is determined by the setting of valve 9′.

As the separate streams of gas leave their respective venturi tubes 3 and 3′, they flow through baffles 13 and 13′ by reason of which the larger particles of dust as well as drops of water are separated from the gas stream. Then the two saturated separate gas streams having different temperatures reach the curved end wall 2′ of housing 2 which forms a chamber in which the two gas streams are intimately mixed becaues of their high velocity. The warm gas becomes cooled below its dew point in such mixing so that within the circular chamber, a mist is formed as the fine and finest particles of dust form seeds for the condensation of the water. This mist then flows through perforated metal sheets 14 and 15 mounted at the entrance to the wet electric filter units and thereby the mist enters the filter units in a uniform flow. The gas mist then flows into the first of three electric filter units and which contains barbed wire emitting electrodes represented by the letter *x*. The very high spark effect of these barbed wire electrodes 16 eliminates the space charge within the gas mist and precipitates a large amount of the vapor. The droplets still remaining in the gas and which have been electrically charged in this first filter unit, then enter the second filter unit 4′ which has wire emitting electrodes 17 star shaped in cross section as indicated by the symbol +, i.e. wires having a plurality of points. Here the spark effect does not reach noteworthy proportions and more dust is precipitated. The gas mist then passes into the third filter unit for precipitating the water droplets still remaining in the gas. This third filter unit has thick round wire emitting electrodes 18 as shown by the symbol *o*, with each wire having a cross-sectional area of from 20 to 50 mm.². No spark effect at all occurs in this third filter unit which acts simply as an absolute field of condensation. The prepicitating plate electrodes 19 are shown in each filter unit. Clean gas leaves the filter through opening 20.

Figure 2:
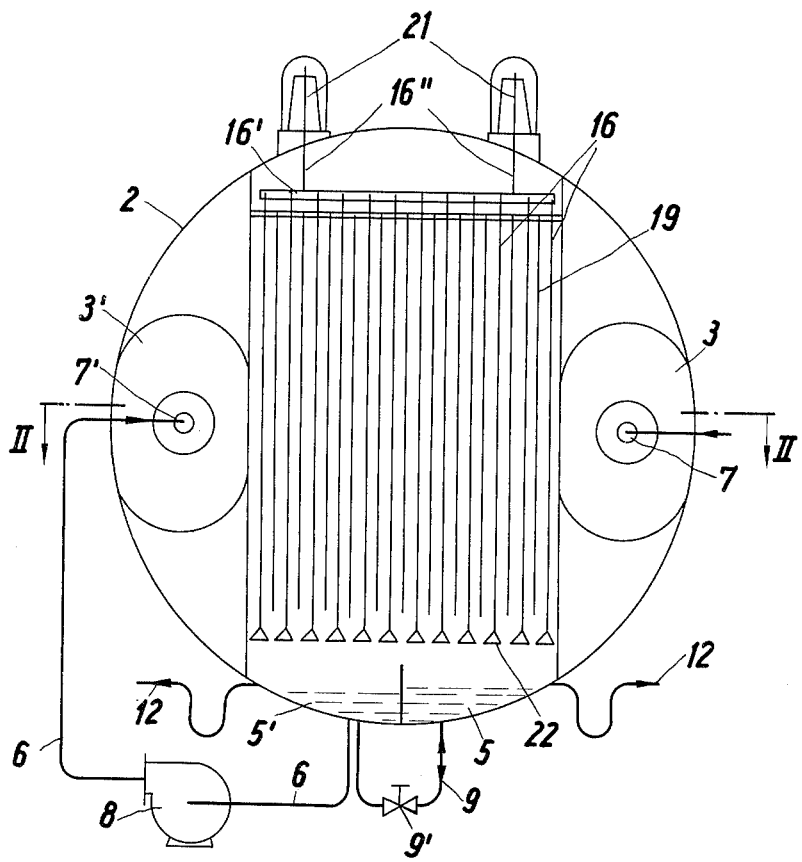
FIGURE 2 is a vertical cross-sectional view taken on the line I—I of FIGURE 1.

FIGURE 2 shows that the outer walls of venturi tubes 3 and 3′ are a part of the exterior wall of filter housing 2. For purposes of illustration, deflection baffles 13 and 13′ have been omitted. The supporting frame 16′ for emitting electrode wire 16 is hung by means of rods 16″ from the insulators 21. Weights 22 on the lower ends of wire electrode 16 serve to keep these electrodes under tension.

Figure 3:
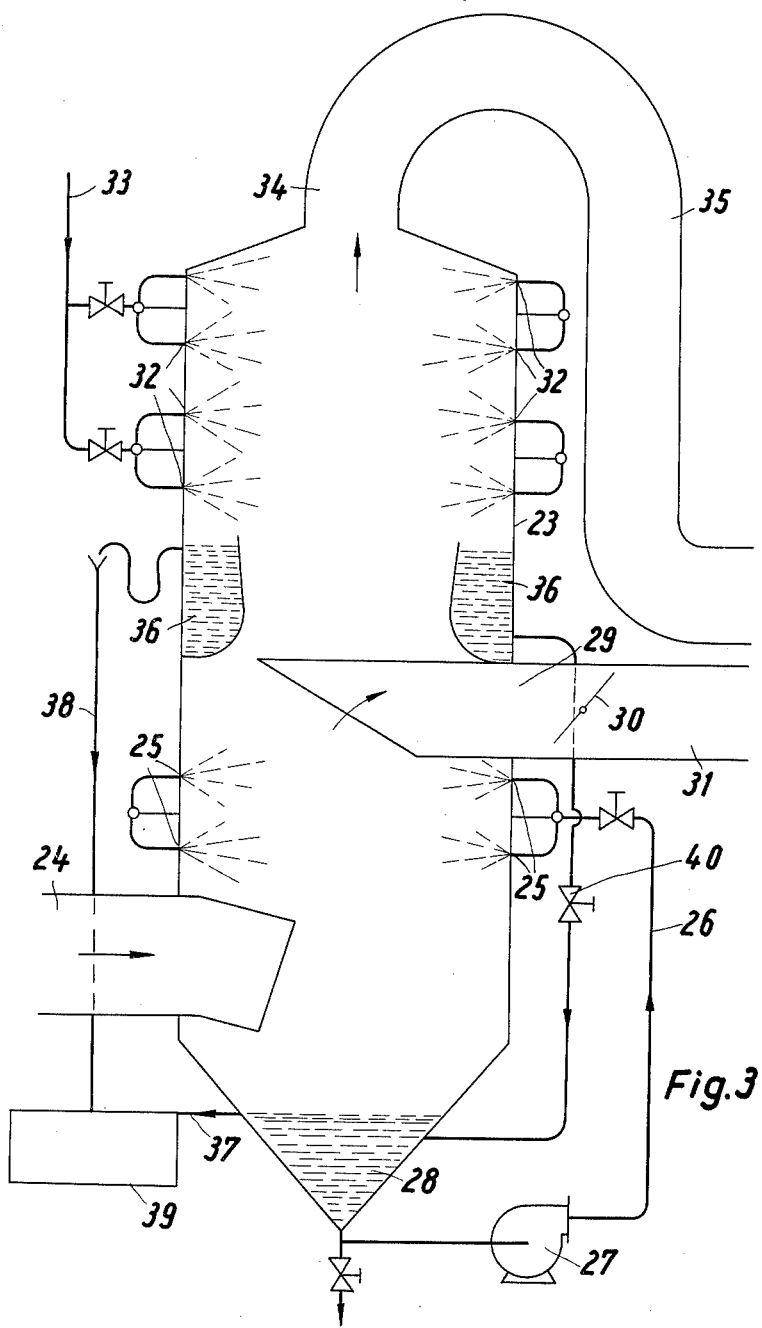
FIGURE 3 is a vertical cross-sectional view through a modified form of the invention in which the gas saturator is separated from the filter units.

In the modification of FIGURE 3, a two zone water jet cooler is used to saturate and cool separate streams of gas at different temperatures according to this invention. Cooler 23 receive raw gas from pipe 24 located at the lower end of the cooler. Nozzles 25 of the lower zone of the cooler are supplied with water through pipe 26 forced by pump 27 from the sump 8 of the cooler so that this water is recycled in a manner similar to that of venturi tube 3′ of FIGURE 1. Water from nozzles 25 effects a cooling and saturation of a portion of the gas which then flows to the upper zone of the cooler. However, a suction hood 29 projects into the cooler to withdraw one separate stream of cool gas which flows through throttle valve 30 into pipe 31. In the upper zone, nozzles 32 are supplied with fresh water through pipe 33. The relation of the temperature in the separated streams of gas in the lower and upper zones are similar to those established for venturi tubes 3 and 3′ in FIGURE 1. Accordingly, the water from nozzles 32 cools the separate stream of gas in the upper zone at a lower temperature than the separate stream of gas removed from the lower zone through pipe 31. In the upper zone, the cooled separate gas stream leaves the zone through opening 34 and pipe 35. These two separate streams of gas are then mixed in order to form a mist for further treatment in the three successive filter units in the electric filter.

The muddy water collected in sump 28 for the lower zone and the sump 36 for the upper zone is piped through lines 37 and 38, respectively, into cleaning basin 39. The valve 40 has the same function as the valve 9′ shown in FIGURE 1.

Having now described the means by which the objects of the invention are obtained,

I claim:

1. In the method for improving the amount of fine dust precipitated in a wet electric filter in which the entering raw gas is first subdivided into two separate gas streams and each stream is saturated with a liquid as in a scrubber or washer, the improvement comprising saturating and cooling each separate stream at a temperature different from the other stream, mixing the saturated streams to form a mist composed of water droplets and dust, and then passing the mist of mixed streams through an electric filter to precipitate the water droplets and the dust from the gas.

2. In a method as in claim 1, each separate stream being cooled to a temperature which is at least 5° C. different from the other separate stream.

3. In a method as in claim 2, each separated stream being saturated with a liquid having a temperature different from the liquid used to saturate the other stream.

4. In a method as in claim 3 in which one separate stream is saturated with fresh water having a temperature of from about 4 to 30° C., and the other separate stream is saturated with water having a temperature of from about 20 to 60° C. and which is continuously recycled, and adding make-up fresh water to said other separate stream to prevent salt deposits and to compensate for water lost to the electric filter.

5. In an electric filter having means for dividing entering raw gas into two separate streams of gas, means for saturating each separate stream of gas with a liquid at a temperature different from the other separate stream, means for mixing the saturated separate streams to form a mist, and means for electrically filtering said mist, the improvement in which the latter means comprises a first filter unit having barbed wire emitting electrodes, a second filter unit having wire emitting electrodes star shaped in cross-section, and a third filter unit having round wire emitting electrodes with each wire having a cross-sectional area of from about 20 to 50 mm.².

6. In an electric filter as in claim 5, further comprising a housing for said filter, and said means for saturating said separate streams of gas comprising a pair of venturi tubes forming a part of the housing for the first, second and third filter units.

7. In an electric filter as in claim 6, said venturi tubes further forming a portion of the exterior wall of the filter housing.

8. In an electric filter as in claim 7, said means for mixing the saturated separate streams comprising a chamber contained by semi-spherical walls forming a portion of the exterior wall of the filter housing.

9. In an electric filter as in claim 8, further comprising a partition in said chamber for forming a separate sump for each separate gas stream.

(References on following page)

References Cited by the Examiner

UNITED STATES PATENTS

| | | | |
|---|---|---|---|
| 617,618 | 1/1899 | Thwaite | 55—152 |
| 1,333,790 | 3/1920 | Bradley | 55—2 |
| 1,357,202 | 10/1920 | Nesbit | 55—136 |
| 1,413,877 | 4/1922 | Schmidt | 55—8 |
| 1,413,993 | 4/1922 | Rhodes | 55—5 |
| 1,479,270 | 1/1924 | Wolcott | 55—8 |
| 1,774,604 | 9/1930 | Lawerence | 55—122 |
| 1,863,578 | 6/1932 | Morse et al. | |
| 2,024,226 | 12/1935 | Irwin et al. | 55—122 |
| 2,369,877 | 2/1945 | White | 55—130 |
| 2,477,021 | 7/1949 | Vingoe. | |
| 2,565,106 | 8/1951 | Westvind et al. | 55—133 X |
| 2,696,892 | 12/1954 | Campbell | 55—8 |
| 2,720,939 | 10/1955 | Stokes | 55—7 |
| 2,881,857 | 4/1959 | Cosby et al. | 55—152 X |
| 2,901,324 | 8/1959 | Howell | 55—124 X |
| 3,063,694 | 11/1962 | Gaw | 55—122 |

FOREIGN PATENTS

| | | |
|---|---|---|
| 1,146,874 | 5/1957 | France. |
| 786,313 | 11/1957 | Great Britain. |

OTHER REFERENCES

Koglin: W.: German printed application No. 1,028,538, April 1958.

HARRY B. THORNTON, *Primary Examiner.*
ROBERT F. BURNETT, *Examiner.*